(12) United States Patent
Matsubara et al.

(10) Patent No.: US 7,123,914 B2
(45) Date of Patent: *Oct. 17, 2006

(54) COMMUNICATION NETWORK SYSTEM

(75) Inventors: Shinzo Matsubara, Hyogo-Ken (JP); Yosuke Tajika, Hyogo-Ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 366 days.

This patent is subject to a terminal disclaimer.

(21) Appl. No.: 10/748,144

(22) Filed: Dec. 31, 2003

(65) Prior Publication Data

US 2004/0151112 A1  Aug. 5, 2004

(51) Int. Cl.
*H04Q 7/20* (2006.01)
*H04L 12/28* (2006.01)

(52) U.S. Cl. .................. 455/436; 455/435; 455/466; 455/517; 455/524; 370/401; 370/403; 370/349; 370/461

(58) Field of Classification Search ............. 455/524, 455/517, 466, 435, 7, 11.1, 14, 15, 16; 370/401, 370/338, 254, 349, 461
See application file for complete search history.

(56) References Cited

U.S. PATENT DOCUMENTS

| | | | |
|---|---|---|---|
| 5,099,346 A | 3/1992 | Lee et al. | |
| 6,161,183 A | 12/2000 | Saito et al. | |
| 6,246,696 B1 | 6/2001 | Yamaguchi et al. | |
| 6,335,812 B1 | 1/2002 | Matsubara et al. | |
| 6,366,584 B1* | 4/2002 | Gulliford et al. | 370/403 |
| 6,480,313 B1 | 11/2002 | Kawamura | |
| 6,549,786 B1* | 4/2003 | Cheung et al. | 455/524 |
| 6,556,553 B1* | 4/2003 | Palmer et al. | 370/333 |
| 6,877,104 B1* | 4/2005 | Shimono | 714/4 |

OTHER PUBLICATIONS

Timothy Williams et al., Infrared Data Association Serial Infrared Link Access Protocol (IrLAP), Infrared Data Association, Apr. 10, 1996, pp. 1-116.

* cited by examiner

*Primary Examiner*—Joseph Feild
*Assistant Examiner*—Julio Perez
(74) *Attorney, Agent, or Firm*—Oblon, Spivak, McClelland, Maier & Neustadt, P.C.

(57) ABSTRACT

A communication network system has a plurality of communication terminals, each having a first transmitting unit and a first receiving unit. Information is transmitted and received among the communication terminals through the first transmitting unit and the first receiving unit. At least two of the communication terminals are used as relay terminals. Each of the relay terminal has a second transmitting unit and a second receiving unit for performing only one-to-one-type communication. A received-information relay unit transmits information received from the first receiving unit to the second transmitting unit and transmits information received from the second receiving unit to the first transmitting unit. A relay-terminal-information transmitting unit transmits to the first transmitting unit ID information of the relay terminal and ID information of a terminal to which the relay terminal is providing relay services. A storage unit stores the information of the relay terminals and relay situations thereof from relay terminal information received from the first receiving unit. When the relay terminal discontinues the relay services, the presence or the absence of an available relay terminal is determined by referring to the storage unit. If there is an available relay terminal, an instruction is provided to the terminal which is receiving the relay services to change the relay terminal.

9 Claims, 12 Drawing Sheets

| RELAY TERMINAL ID INFORMATION | ONE-TO-ONE-TYPE COMMUNICATION TERMINAL ID INFORMATION |
|---|---|
| Cs1 | Cc1 |
| Cs2 | NONE |
| Cs3 | NONE |
| Cs4 | Cc2 |

FIG.5

| RELAY TERMINAL ID INFORMATION | ONE-TO-ONE-TYPE COMMUNICATION TERMINAL ID INFORMATION | RELAY SITUATION |
|---|---|---|
| Cs1 | Cc1 | |
| Cs2 | NONE | TAKING OVER RELAY SERVICES |
| Cs3 | NONE | |
| Cs4 | Cc2 | |

FIG.8

| RELAY TERMINAL ID INFORMATION | ONE-TO-ONE-TYPE COMMUNICATION TERMINAL ID INFORMATION |
|---|---|
| Cs1 | NONE |
| Cs2 | NONE |
| Cs3 | Cc3 |

FIG.10

COMMUNICATION NETWORK SYSTEM

This application is based upon and claims the benefit of priority under 35 USC §120 from U.S. Ser. No. 09/534,457, filed Mar. 27, 2000 now U.S. Pat. No. 6,693,875, and under 35 USC §119 from Japanese Patent Application Nos. 11-091719, filed Mar. 31, 1999, the entire contents of each are incorporated herein by reference.

BACKGROUND OF THE INVENTION

1. Field of the Invention

The present invention relates to a communication network system in which communication can be performed among a plurality of mobile terminals.

2. Description of the Related Art

Optical communication using infrared rays is being performed as a data communication interface for use in personal computers and mobile terminals including personal digital assistants (PDA). The infrared data association (IrDA) protocol is a standard protocol for infrared optical communications.

However, in infrared optical communication using this IrDA standard protocol, only a one-to-one-type communication function is supported. Thus, when a single one-to-one-type communication terminal communicates with a plurality of terminals connected via a local area network (LAN), it is necessary to connect at least one relay terminal having both the IrDA function and the LAN function to a LAN system circuit. Then, communication is performed via this relay terminal.

As in the IrDA communication interface, a data communication interface using a modem connected to a telephone line also supports only a one-to-one-type communication function. Terminals using IrDA or a modem and merely having a one-to-one-type communication function are hereinafter referred to as "one-to-one-type communication terminals".

Such a one-to-one-type communication terminal can communicate with a plurality of terminals by the provision of a relay terminal which relays information of the one-to-one-type communication terminal to the other terminals. However, the following problems are encountered if IrDA is used as a communication interface.

If the relay terminal or the one-to-one-type communication terminal using IrDA is moved, the communication link may be disconnected. When the relay terminal discontinues relay services, the one-to-one-type communication terminal is no longer able to communicate with the other terminals.

However, even if the relay terminal is moved or the relay services are discontinued, the provision of an extra relay terminal which takes over the relay services in a network (LAN) makes it possible to continue relaying information of the one-to-one-type communication terminal, which can thus communicate with the other terminals.

However, the one-to-one-type communication terminal is not disposed in the network. It is thus impossible for the one-to-one-type communication terminal to monitor the situations of the terminals connected to the network nor can it check for the presence of another relay terminal in the network even if it attempts to send a relay request to the relay terminal.

Similarly, in performing communication using a modem, problems similar to those presented by IrDA communication may be encountered if relay services are discontinued or a telephone line is disconnected, thereby discontinuing communications between a one-to-one-type communication terminal using a modem and other terminals. There may be provided a mechanism for indicating another relay terminal which takes over relay services before the corresponding relay terminal discontinues the relay services. Even in this case, if a communication link is accidentally disconnected for a one-to-one-type communication terminal using IrDA, or if a telephone line is disconnected for a one-to-one-type communication terminal using a modem, communication can no longer be performed.

Even if the relay services are successfully passed from one relay terminal to another relay terminal, the one-to-one-type communication terminal first sends a connection request to the indicated relay terminal, and then, after a communication link is established, the one-to-one-type communication terminal is able to receive the relay services. In other words, the one-to-one-type communication terminal is unable to receive information sent to this terminal until the communication link with the designated relay terminal is established.

Additionally, a one-to-one-type communication terminal using a modem cannot even be connected to a relay terminal while the relay terminal has already started to provide relay services. If only one telephone number of the relay terminal is known to the one-to-one-type communication terminal, the terminal cannot even be connected to the relay terminal, thus failing to receive the relay services.

The aforementioned IrDA communication interface and the modems are major communication interfaces for use in mobile personal computers and mobile terminals. Thus, the above-described problems are becoming serious as mobile computing is becoming widespread and is more commonly utilized.

Therefore, in communicating with a plurality of terminals via a relay terminal, even if a one-to-one-type communication terminal becomes unable to communicate with the relay terminal, the communication must be continued by passing relay services from the relay terminal to another relay terminal disposed in a network.

SUMMARY OF THE INVENTION

Accordingly, it is an object of the present invention to provide a communication network system which enables a one-to-one-type communication terminal connected to a communication network, such as a LAN, via a relay terminal to continue communicating with a plurality of terminals disposed in the network by informing the one-to-one-type communication terminal of the presence of another relay terminal even if a communication link with the relay terminal is accidentally disconnected or relay services provided by the relay terminal are discontinued, and which allows the one-to-one-type communication terminal to continue receiving information from the other terminals without discarding it even before a communication link with the newly indicated relay terminal is established.

In order to achieve the above object, according to one aspect of the present invention, there is provided a communication network system including a plurality of communication terminals, each having a first transmitting unit and a first receiving unit, connected via a transmission channel. Information is transmitted and received among the communication terminals through the first transmitting unit and the first receiving unit. At least two of the communication terminals are used as relay communication terminals. Each of the relay communication terminals includes a second transmitting unit for performing only one-to-one-type communication and a second receiving unit for performing only one-to-one-type communication. A received-information relay unit transmits information received from the first receiving unit to the second transmitting unit and transmits information received from the second receiving unit to the first transmitting unit. A relay-terminal-information transmitting unit transmits to the first transmitting unit terminal identification information of the relay terminal and terminal identification information of a terminal to which the relay terminal is providing relay services as relay terminal information. A relay terminal storage unit stores information of the relay terminal and another relay terminal and relay situations of the relay terminals from the relay terminal information received from the first receiving unit. Upon discontinuing the relay services by the relay terminal which is providing the relay services, the presence or the absence of an available relay terminal is determined by referring to the relay terminal storage unit, and if there is an available relay terminal, an instruction is provided to the terminal which is receiving the relay services to change the relay terminal.

With this configuration, even if a relay terminal discontinues relay services, an available relay terminal in a network can take over the relay services, thereby enabling a one-to-one-type communication terminal to continue communicating with the other terminals.

According to the aforementioned communication network system, the relay-terminal-information transmitting unit may have a function of regularly transmitting the relay terminal information.

With this arrangement, a one-to-one-type communication terminal is able to monitor the current relay situation of the relay terminals disposed in the network. Accordingly, even if a communication link is accidentally disconnected, the one-to-one-type communication terminal searches for another relay terminal without the need for the designation of another relay terminal from the current relay terminal, thereby making it possible to continue receiving the relay services.

According to the aforementioned communication network system, upon discontinuing the relay services by the relay terminal, the terminal which is receiving the relay services may change from the relay terminal to a subsequent relay terminal, and the subsequent terminal may then store received information until a connection is established with the terminal which is receiving the relay services.

With this arrangement, until a communication link is established between the one-to-one-type communication terminal and the subsequent relay terminal which is to take over the relay services, the information addressed to the one-to-one-type communication terminal is received and stored by the subsequent relay terminal. Thus, the one-to-one-type communication terminal is able to receive information without losing it.

According to another aspect of the present invention, there is provided a communication network system including a plurality of communication terminals, each having a first transmitting unit and a first receiving unit, connected via a transmission channel. Information is transmitted and received among the communication terminals through the first transmitting unit and the first receiving unit. At least one of the communication terminals is used as a central relay communication terminal, and at least one of the communication terminals is used as a relay communication terminal. The relay communication terminal including a second transmitting unit for performing only one-to-one-type communication and a second receiving unit for performing only one-to-one-type communication. A received-information relay unit transmits information received from the first receiving unit to the second transmitting unit and transmits information received from the second receiving unit to the first transmitting unit. A relay-terminal-information transmitting unit transmits to the first transmitting unit terminal identification information of the relay terminal and terminal identification information of a terminal to which the relay terminal is providing relay services as relay terminal information. The central relay communication terminal includes a relay-terminal storage unit for storing information of the relay terminal and another relay terminal and relay situations of the relay terminals from the relay terminal information received from the first receiving unit. Thus, an available relay terminal can be designated to a terminal which makes a request to provide the relay services.

With this configuration, only the central communication terminal receives a request for relay services from the one-to-one-type communication terminal. Accordingly, when a one-to-one-type communication function is implemented by using a modem, only one telephone number is required for enabling the one-to-one-type communication terminal to receive the relay services.

According to the aforementioned communication network system, at least two of the first transmitting units and at least two of the first receiving units may be provided.

According to the above-described communication network system, at least two of the second transmitting units and at least two of the second receiving units may be provided.

According to the above-described communication network system, at least two of the first transmitting units and at least two of the first receiving units may be provided, and at least two of the second transmitting units and at least two of the second receiving units may be provided.

According to still another aspect of the present invention, there is provided a communication network system including a plurality of communication terminals, each having a first transmitting unit and a first receiving unit, connected via a transmission channel. Information is transmitted and received among the communication terminals through the first transmitting unit and the first receiving unit. At least two of the communication terminals are used as relay communication terminals. Each of the relay communication terminals includes a second transmitting unit for performing only one-to-one-type communication and a second receiving unit for performing only one-to-one-type communication. A third transmitting unit performs only one-to-N-type communication. A third receiving unit performs only one-to-N-type communication. A received-information relay unit transmits information received from the first receiving unit to the second transmitting unit and to the third transmitting unit, and transmits information received from the second receiving unit to the first transmitting unit and to the third transmitting unit, and transmits information received from the third receiving unit to the first transmitting unit and to the second transmitting unit. A relay-terminal-information transmitting unit transmits to the first transmitting unit terminal identification information of the relay terminal and terminal identification information of a terminal to which the relay terminal is providing relay services as relay terminal information. A relay terminal storage unit stores information of the relay terminal and another relay terminal and relay situations of the relay terminals from the relay terminal information received from the first receiving unit. Upon discontinuing the relay services by the relay terminal which is providing the relay services, the presence or the absence of an available relay terminal is determined by referring to the relay terminal storage unit, and if there is an available relay terminal, an instruction is provided to the terminal which is receiving the relay services to change the relay terminal.

According to a further aspect of the present invention, there is provided a relay terminal for use in a communication network system which includes a plurality of communication terminals, each having a first transmitting unit and a first receiving unit, connected via a transmission channel. Information is transmitted and received among the communication terminals through the first transmitting unit and the first receiving unit. One of the communication terminals is used as the relay terminal. The relay terminal includes a second transmitting unit for performing only one-to-one-type communication and a second receiving unit for performing only one-to-one-type communication. A received-information relay unit transmits information received from the first receiving unit to the second transmitting unit and transmits information received from the second receiving unit to the first transmitting unit. A relay-terminal-information transmitting unit transmits to the first transmitting unit terminal identification information of the relay terminal and terminal identification information of a terminal to which the relay terminal is providing relay services as relay terminal information. A relay terminal storage unit stores information of the relay terminal and another relay terminal and relay situations of the relay terminals from the relay terminal information received from the first receiving unit. Upon discontinuing the relay services by the relay terminal which is providing the relay services, the presence or the absence of an available relay terminal is determined by referring to the relay terminal storage unit, and if there is an available relay terminal, an instruction is provided to the terminal which is receiving the relay services to change the relay terminal.

According to a yet further aspect of the present invention, there is provided a method for relaying information between a plurality of communication terminals in a communication network system. At least two of the communication terminals are used as relay communication terminals. The method includes a first transmitting step, a second transmitting step, a storage step, a determining step, and a providing step. In the first transmitting step, information received from one communication terminal is transmitted to another communication terminal. In the second transmitting step, terminal identification information of the relay terminal and terminal identification information of a terminal to which the relay communication terminal is providing relay services are transmitted as relay terminal information. In the storage step, information of the relay terminal and another relay terminal and relay situations of the relay terminals are stored from the relay terminal information transmitted in the second transmitting step. In the determining step, the presence or the absence of an available relay terminal is determined by referring to the relay terminal information stored in the storage step when the relay terminal discontinues the relay services. In the providing step, an instruction is provided to the terminal which is receiving the relay services to change the relay terminal.

BRIEF DESCRIPTION OF THE DRAWINGS

FIG. 5 illustrates an example of the storage table of a relay terminal storage unit according to the first embodiment of the present invention;

FIG. 8 illustrates an example of the storage table of a relay terminal storage unit according to a third embodiment of the present invention;

FIG. 10 illustrates an example of the storage table of a relay terminal storage unit according to the fourth embodiment of the present invention;

DESCRIPTION OF THE PREFERRED EMBODIMENTS

The present invention is described below through illustrations of preferred embodiments with reference to the drawings.

First Embodiment

As discussed above, there is conventionally provided a communication network system which enables multicast communication among a plurality of terminals including one-to-one-type communication terminals using IrDA or a modem by relaying information sent from and to the one-to-one-type communication terminals. In this system, however, if the relay terminal discontinues relay services, the one-to-one-type communication terminals are no longer able to communicate with the other terminals.

In the present invention, the following type of communication network system is implemented in which a one-to-one-type communication terminal is able to continue communicating with other terminals, even if a relay terminal discontinues relay services, by connecting the one-to-one-type communication terminal to an extra relay terminal disposed in a network.

Figure 1:
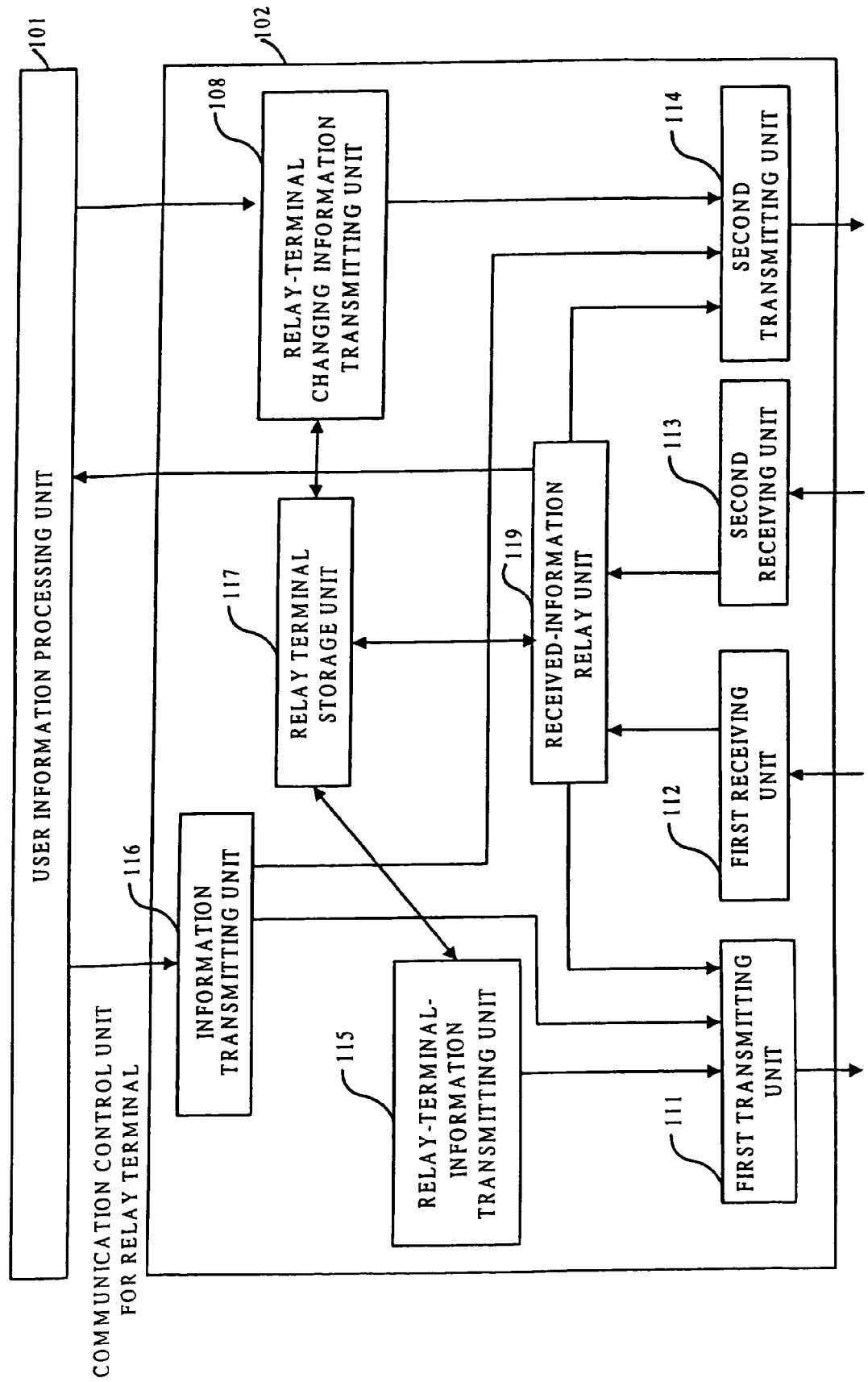
FIG. 1 is a block diagram schematically illustrating the configuration of a relay terminal according to a first embodiment of the present invention.
Figure 2:
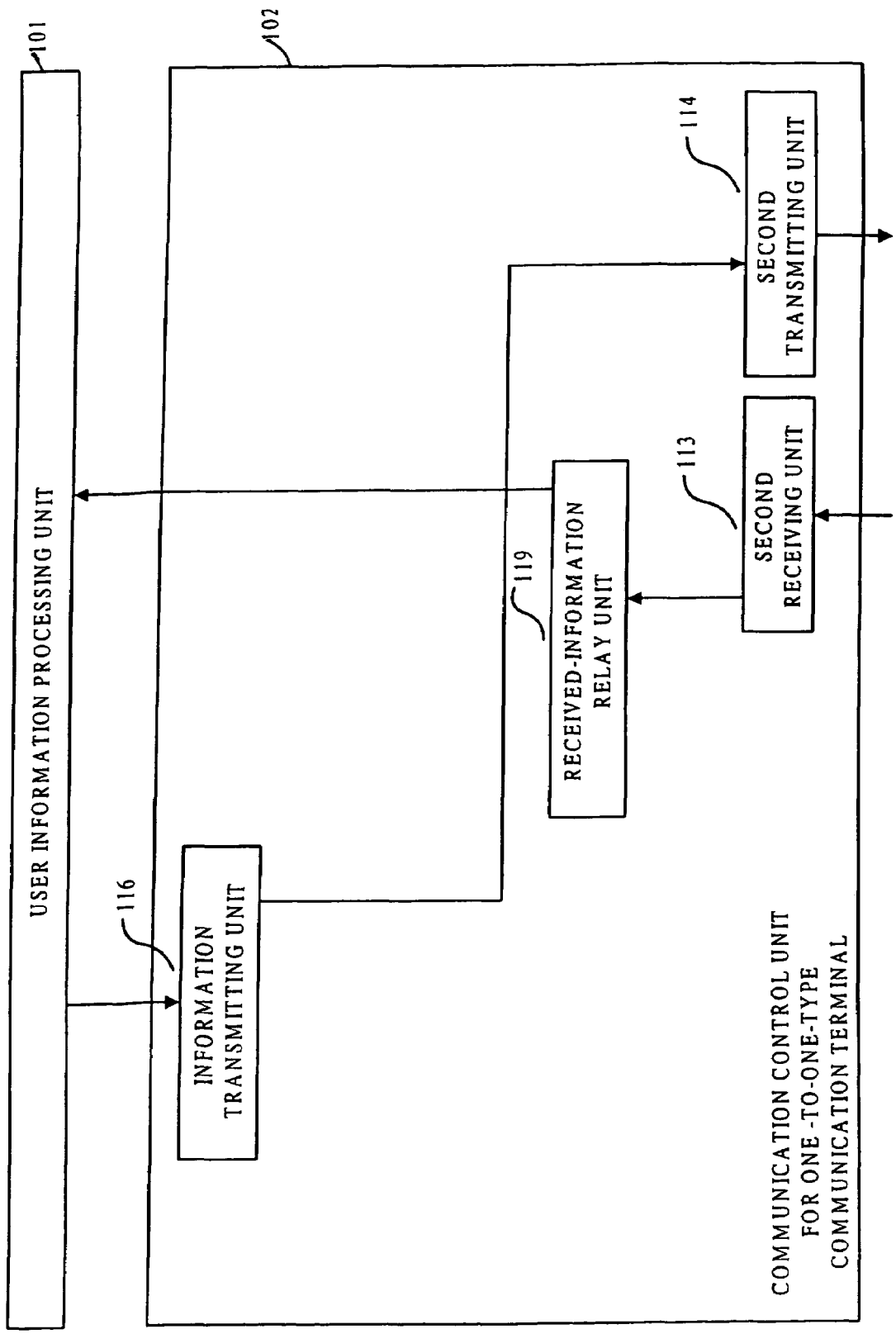
FIG. 2 is a block diagram schematically illustrating the configuration of a one-to-one-type communication terminal according to the first embodiment of the present invention.
Figure 3:
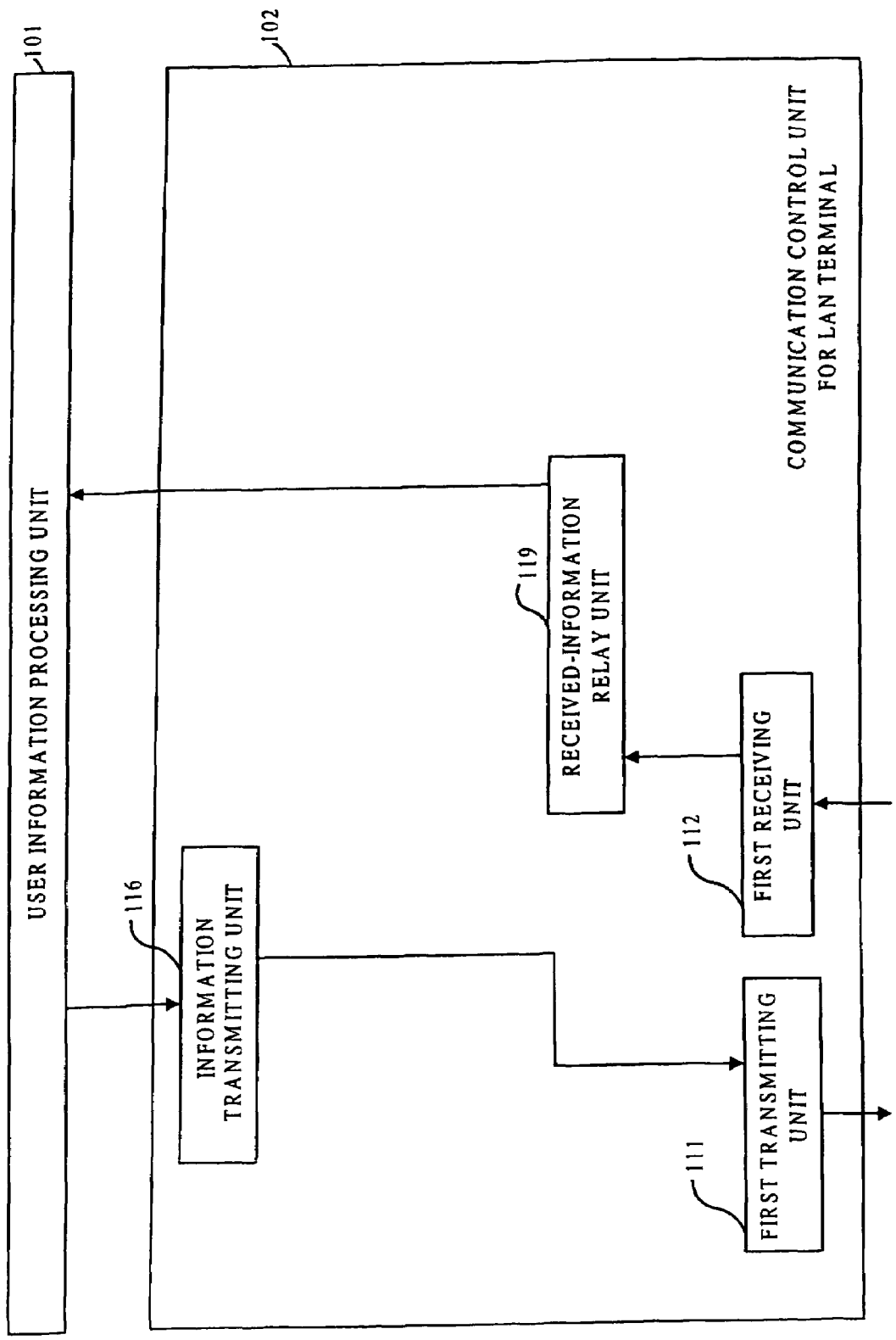
FIG. 3 is a block diagram schematically illustrating the configuration of a LAN terminal according to the first embodiment of the present invention.

FIGS. 1 through 3 are schematic diagrams illustrating communication terminals according to a first embodiment of the present invention. The communication terminals are each formed of a user information processing unit 101 for running applications, and a communication control unit 102 for controlling communication. FIG. 1 illustrates the configuration of a relay terminal; FIG. 2 illustrates the configuration of a one-to-one-type communication terminal; and FIG. 3 illustrates the configuration of a LAN terminal.

According to the relay terminal shown in FIG. 1, the communication control unit 102 includes a first transmitting unit 111, a first receiving unit 112, a second receiving unit 113, a second transmitting unit 114, a relay-terminal-information transmitting unit 115, an information transmitting unit 116, a relay terminal storage unit 117, a relay-terminal changing information transmitting unit 118, and a received-information relay unit 119.

According to the one-to-one-type communication terminal illustrated in FIG. 2, the communication control unit 102 has the second receiving unit 113, the second transmitting unit 114, the information transmitting unit 116, and the received-information relay unit 0.119.

According to the LAN terminal shown in FIG. 3, the communication control unit 102 is formed of the first transmitting unit 111, the first receiving unit 112, the information transmitting unit 116, and the received-information relay unit 119.

The basic functions of the above-described terminals are the same. However, the LAN terminal has only the first transmitting unit 111 and the first receiving unit 112 as a means of communication, while the one-to-one-type communication terminal has only the second transmitting unit 114 and the second receiving unit 113 as a means of communication.

In the following description, a discussion is primarily given of the relay terminal shown in FIG. 1 having both functions provided for the LAN terminal and for the one-to-one-type communication terminal. The functions of the LAN terminal and the functions of the one-to-one-type communication terminal overlap with those of the relay terminal, and an explanation thereof will thus be omitted.

According to the relay terminal, the information transmitting unit 116 of the communication control unit 102 supplies information to the first transmitting unit 111 or the second transmitting unit 114 and the supplied information is transmitted therefrom. More specifically, the information transmitting unit 116 supplies transmission information requested by the user information processing unit 101 to the first transmitting unit 111 or the second transmitting unit 114.

The user information processing unit 101 serves as an information processing function for running applications. The relay-terminal-information transmitting unit 115 acquires from the relay terminal storage unit 117 information of a one-to-one-type communication terminal to which the relay terminal is currently providing relay services, and transmits terminal ID information of the relay terminal and terminal ID information of the above-mentioned one-to-one-type communication terminal to the first transmitting unit 111.

The first transmitting unit 111 serves as a fast communication unit implementing a serial communication function for sending and receiving data via a transmission channel. The first transmitting unit 111 transmits information requested by the information transmitting unit 116, the relay-terminal-information transmitting unit 115, or the received-information relay unit 119.

The second transmitting unit 114 may be provided with an infrared source and drives it according to supplied information so as to transmit an infrared signal. In this case, the second transmitting unit 114 may transmit information requested by the information transmitting unit 116, the relay-terminal changing information transmitting unit 118, or the received-information relay unit 119 by means of non-contact communication (wireless communication) using the infrared signal. Alternatively, the second transmitting unit 114 may transmit information via a modem, in which case, it may transmit information requested by the information transmitting unit 116, the relay-terminal changing information transmitting unit 118, or the received-information relay unit 119 through a telephone line via the modem.

The second receiving unit 113 may be provided with a photodetector for performing photoelectric conversion. In this case, the second receiving unit 113 may convert an infrared signal received by means of non-contact communication (wireless communication) into an electrical signal and output it. Alternatively, the second receiving unit 113 may convert received information into an electrical signal and output it through a telephone line via a modem.

The first receiving unit 112 receives signals transmitted via a signal transmission channel, and thus serves as a serial communication function for receiving data via the transmission channel. The first receiving unit 112 and the second receiving unit 113 send received information to the received-information relay unit 119.

The received-information relay unit 119 has both functions of identifying the received information and transferring it. More specifically, if the information received from the first receiving unit 112 or the second receiving unit 113 is relay terminal information, the received-information relay unit 119 sends this information to the relay terminal storage unit 117. If the received information is not relay terminal information but is addressed to the relay terminal itself, the received-information receiving unit 119 transfers the information to the user information processing unit 101 and also to the first transmitting unit 111 or the second transmitting unit 114. If the received information is not addressed to the relay terminal, the received-information receiving unit 119 transfers the information not to the user information processing unit 101 but to the first transmitting unit 111 or the second transmitting unit 114.

The relay terminal storage unit 117 has the function of registering information of a one-to-one-type communication terminal to which the relay terminal is currently providing relay services and the function of storing a current relay situation. The current relay situation is stored by determining which relay terminal is providing relay services and which one-to-one-type communication terminal is receiving them according to the relay terminal information obtained from the received-information relay unit 119.

When the relay terminal discontinues relay services, the relay-terminal changing information transmitting unit 118 sends ID information of an available relay terminal obtained from the relay terminal storage unit 117 to the one-to-one-type communication terminal which is receiving relay services.

In the communication network system according to the present invention through illustrations of the following embodiments, it is assumed that a wireless LAN is used as a core system and mobile terminals are primarily used. However, the essence of the present invention is not altered even if the present invention is applied to a cable LAN primarily having fixed terminals or a LAN having both fixed terminals and mobile terminals. Additionally, the present invention is used in a LAN as an example only, and it may be applied to another type of communication network other than the LAN.

In the communication network system constructed in accordance with the first embodiment, a method for registering information of a one-to-one-type communication terminal in the relay terminal storage unit 117 (i.e., for storing information to which one-to-one-type communication terminal the relay terminal is providing relay services) is discussed below with reference to FIG. 4.

Figure 4:
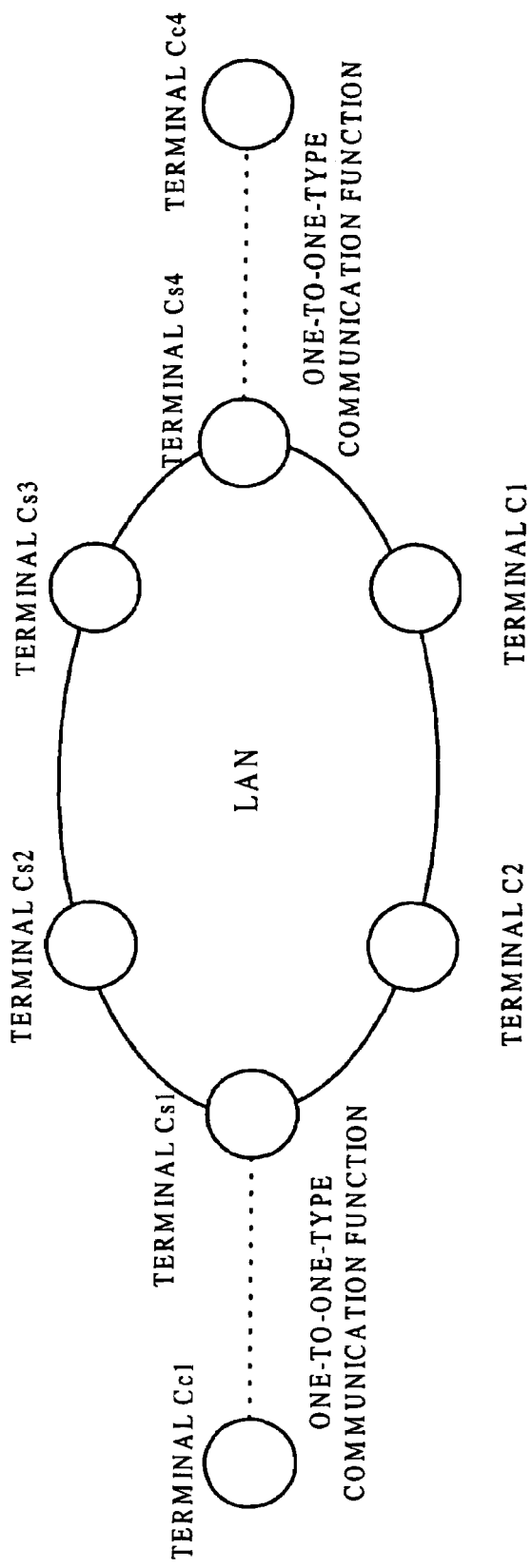
FIG. 4 illustrates the current relay situation in a network system according to the first embodiment of the present invention.

In FIG. 4, eight terminals, such as C1, C2, Cs1, Cs2, Cs3, Cs4, Cc1, and Cc2, are provided. Among these terminals, the terminals C1, C2, Cs1, Cs2, Cs3, and Cs4 form a LAN so that they can communicate with each other.

The terminals Cs1, Cs2, Cs3, and Cs4 are configured, as shown in FIG. 1, and implement not only a serial communication function by being connected to a transmission channel forming the LAN, but also a one-to-one-type communication function by using IrDA or a modem.

The terminals C1, C2, Cs1, Cs2, Cs3, and Cs4 are connected to a transmission channel L forming the LAN, thereby implementing a serial communication function of sending and receiving data via the transmission channel L. However, the terminals C1 and C2 do not have a one-to-one-type communication function implemented by using IrDA or a modem. The terminals Cc1 and Cc2 are not connected to the LAN, and merely have a one-to-one-type communication function by using IrDA or a modem.

As discussed above, the terminals Cs1, Cs2, Cs3, and Cs4 have both the serial communication function and the one-to-one-type communication function. Accordingly, the terminals Cs1, Cs2, Cs3, and Cs4 assume the role in relaying information of the one-to-one-type communication terminals Cc1 and Cc2 by using IrDA or a modem, and are thus referred to as "relay terminals".

The relay terminals Cs1 and Cs4 each store a current relay situation in the relay terminal storage unit 117. A method for registering the one-to-one-type communication terminal to which the relay terminal Cs1 or Cs4 is currently providing relay services is as follows.

The user information processing unit 101 of the one-to-one-type communication terminal Cc1 or Cc2 sends relay request information to the relay terminal Cs1 or Cs4 via the information transmitting unit 116.

The user information processing unit 101 specifies an IrDA relay terminal with which a communication link has already been established or a relay terminal with which communication has been performed through a telephone line via a modem by dialing up a specific telephone number. Upon receiving the relay request information, the second receiving unit 113 of the relay terminal Cs1 or Cs4 transmits this information to the received-information relay unit 119. If there is no one-to-one-type communication terminal to which the relay terminal Cs1 or Cs4 is providing relay services, the received-information relay unit 119 stores ID information of the one-to-one-type communication terminal which has sent the relay request information.

In this example shown in FIG. 4, when the relay terminal Cs1 receives relay request information from the one-to-one-type communication terminal Cc1, and when the relay terminal Cs4 receives relay request information from the one-to-one-type communication terminal Cc2, the ID information of the terminals Cc1 and Cc2 is registered in the relay terminal storage unit 117, as illustrated in FIG. 5.

Upon completion of registering the ID information in the relay terminal storage unit 117, the received-information relay unit 119 reports to the one-to-one-type communication units Cc1 and Cc2 that the request has been accepted by sending the corresponding information from the second transmitting unit 114.

If the corresponding relay terminal is already occupied with relaying for another one-to-one-type communication terminal, a communication link fails to be established with an IrDA relay terminal, or there is no response from a relay terminal using a modem. Accordingly, the one-to-one-type communication terminal searches for another relay terminal without sending relay request information.

In this manner, the terminals Cc1 and Cc2 have only a one-to-one-type communication function by using IrDA or a modem. However, since the terminals Cc1 and Cc2 are able to communicate with the relay terminals Cs1, Cs2, Cs3, and Cs4 by using the one-to-one-type communication function, the terminal Cc1 can communicate with not only the terminal Cs1, but also the terminals Cs2, Cs3, Cs4, C1, C2, and Cc2 via Cs1. Similarly, the terminal Cc2 becomes communicable with the other terminals via the relay terminal Cs4.

If, however, the relay terminal Cs1 discontinues relay services, the one-to-one-type communication terminal Cc1 is no longer able to communicate with not only the terminal Cs1, but also the other terminals Cs2, Cs3, Cs4, C1, C2, and Cc2.

The other relay terminals Cs2 and Cs3 are available in the network. Thus, before discontinuing the relay services, the relay terminal Cs1 reports to the one-to-one-type communication terminal Cc1 via the relay-terminal changing information transmitting unit 118 that connections should be changed from Cs1 to another relay terminal.

The processing executed by the relay-terminal changing information transmitting unit 118 when reporting the above-mentioned information to the terminal Cc1 is as follows.

The relay terminal Cs1 sends the relay terminal information from the relay-terminal-information transmitting unit 115 via the first transmitting unit 111. The relay terminal information indicates the ID information of a relay terminal which is currently providing relay services, in this case, Cs1, and the ID information of a one-to-one-type communication terminal which is currently receiving relay services, in this case, Cc1.

Since there is no one-to-one-type communication terminal to which the relay terminal Cs2 is currently providing relay services, the relay terminal Cs2 sends relay information indicating only the ID information Cs2.

When the one-to-one-type communication function is implemented by a modem, the telephone number of the corresponding relay terminal may be sent as the ID information.

Upon receiving relay terminal information from the other relay terminals, the first receiving unit 112 of the relay terminal Cs1 transmits the information to the received-information relay unit 119, which then sends the information to the relay terminal storage unit 117. The relay terminal storage unit 117 determines from the relay terminal information the ID information of the relay terminals and the presence or the absence of one-to-one-type communication terminals to which the relay terminals are providing relay services. If there is a one-to-one-type communication terminal which is receiving relay services, the ID information of the one-to-one-type communication terminal is stored. If there is no such a one-to-one-type communication terminal, information indicating the absence of a one-to-one-type communication terminal is stored.

FIG. 5 shows an example of the information stored in the relay terminal storage unit 117 of the relay terminal Cs1 according to the relay situation shown in FIG. 4. As stated above, the relay terminal storage unit 117 stores relay terminal ID information and one-to-one-type communication terminal ID information. For example, when Cs1 is set in the relay terminal ID information, and Cc1 is set in the one-to-one-type communication terminal ID information, the relay terminal Cs1 is providing relay services to the one-to-one-type communication terminal Cc1.

Upon receiving a relay discontinuation request from the user information processing unit 101, the relay-terminal changing information transmitting unit 118 sends the relay-terminal changing information from the second transmitting unit 114. The relay-terminal changing information includes the ID information of an available relay terminal obtained from the relay terminal storage unit 117. If there is no available relay terminal, the corresponding information is sent to the one-to-one-type communication terminal.

According to the relay situation shown in FIG. 4, the relay terminal Cs1 may send to the one-to-one-type communication terminal Cs1 the ID information of both the relay terminals Cs2 and Cs3 as the relay-terminal changing information. Alternatively, the relay terminal Cs1 may send the ID information of either of the terminal Cs2 or Cs3. When the one-to-one-type communication function is implemented by a modem, the relay terminal Cs1 may send the telephone numbers of the terminals Cs2 and Cs3 as the ID information.

Upon receiving the relay-terminal changing information, the second receiving unit 113 of the one-to-one-type communication terminal Cc1 transmits the information to the received-information relay terminal 119, which then makes a request to the user information processing unit 101 to change the relay terminal. When the one-to-one-type communication function is implemented by using IrDA, the received-information relay terminal 119 provides the user information processing unit 101 the ID information of a relay terminal with which an IrDA link is established. When the one-to-one-type communication function is implemented by using a modem, the received-information relay terminal 119 provides the telephone number of the corresponding relay terminal.

In response to the request for changing the relay terminal, the user information processing unit 101 requests the designated relay terminal to relay the information of the one-to-one-type communication terminal. According to the situation shown in FIG. 4, if the relay terminal Cs2 is designated to take over the relay services from the terminal Cs1, the user information processing unit 101 of the terminal Cc1 sends a relay request to the relay terminal Cs2. Upon accepting the relay request by the relay terminal Cs2, the one-to-one-type communication terminal Cc1 is able to continue communicating with not only the terminal Cs2, but also the other terminals Cs3, Cs4, C1, C2, and Cc2.

A plurality of relay terminals may be designated to take over the relay services, in which case, the one-to-one-type communication terminal may select one of the relay terminals.

As described above, according to the communication network system described in the first embodiment of the present invention, even if a relay terminal discontinues relay services, it informs a one-to-one-type communication terminal of the presence of an available relay terminal. This enables the one-to-one-type communication terminal to continue communicating with the other terminals by using the designated relay terminal.

In the foregoing embodiment, when the one-to-one-type communication function is implemented by IrDA, the one-to-one-type communication terminal may be unable to receive relay-terminal changing information due to, for example, an IrDA terminal being moved, in which case, communication may be suddenly discontinued. Likewise, communication with a relay terminal by using a modem may be discontinued due to a sudden disconnection of a telephone line.

In terms of dealing with such accidental disconnection of communication, the present invention is now described through illustration of a second embodiment.

Second Embodiment

In the second embodiment, the aforementioned accidental disconnection of communication can be overcome by sending relay terminal information received by a relay terminal to a one-to-one-type communication terminal, thereby enabling the one-to-one-type communication terminal to send a relay request to another relay terminal.

Figure 6:
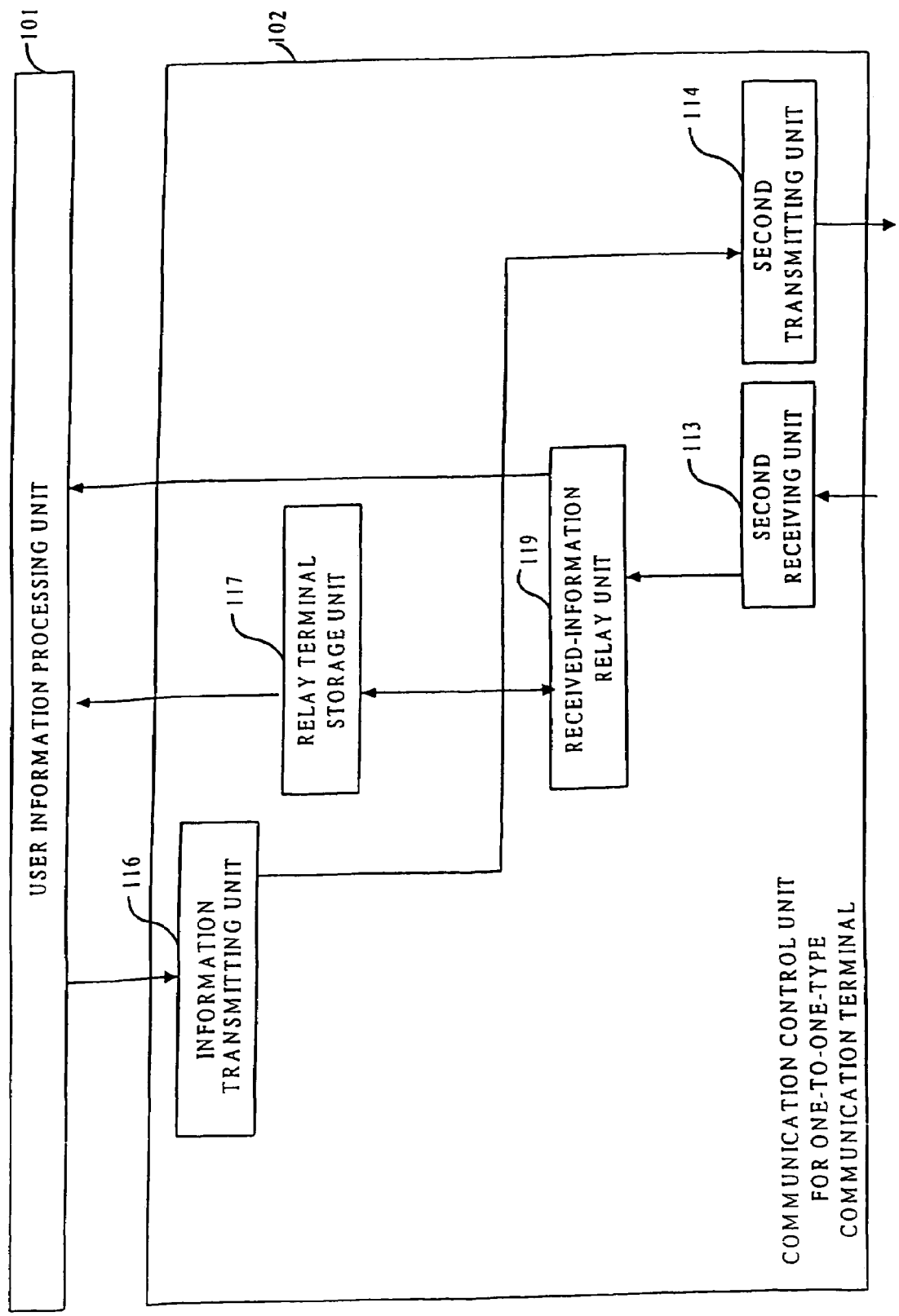
FIG. 6 is a block diagram schematically illustrating the configuration of a one-to-one-type communication terminal according to a second embodiment of the present invention.

Details of the second embodiment are discussed below with reference to FIG. 6. A relay terminal and a LAN terminal used in this embodiment are configured as shown in FIGS. 1 and 3, respectively. A one-to-one-type communication unit is configured as shown in FIG. 6 and is different from the counterpart shown in FIG. 2 in that the relay terminal storage unit 117 is disposed in the communication control unit 102. As in the relay terminal of the first embodiment, the relay terminal storage unit 117 stores, from the received relay terminal information, which relay terminal is providing relay services and which communication unit is receiving them.

The processing executed by the relay terminal storage unit 117 is described below according to the situation shown in FIG. 4, as has been discussed in the first embodiment.

The relay terminal information transmitting unit 115 of the relay terminal Cs1, Cs2, Cs3, or Cs4 regularly transmits the relay terminal information from the first transmitting unit 111. The relay terminal sends the relay terminal information received from the other relay terminals via the first receiving unit 112 and transmits it from the second transmitting unit 114 via the received-information relay unit 119.

This enables a one-to-one-type communication terminal to receive the relay terminal information from all the relay terminals disposed in the network via the second receiving unit 113. Then, the second receiving unit 113 sends the relay terminal information to the received-information relay unit 119, which then transmits only the relay terminal information to the relay terminal storage unit 117. The relay terminal storage unit 117 stores the relay terminal information, as in that of the relay terminal of the first embodiment.

In the example shown in FIG. 4, the information stored in the relay terminal storage unit 117 of the one-to-one-type communication terminal Cc1 is shown in FIG. 5, as in the information of the relay terminal Cs1 of the first embodiment. However, the information stored in the one-to-one-type communication unit Cc1 differs from that stored in the relay terminal of the first embodiment in that the time at which the relay terminal information is received from each relay terminal is also recorded. This information is used for determining whether relay terminal information, which must be transmitted regularly, has been reliably received in case of the occurrence of accidental communication failures due to a disconnection of an IrDA link or a disconnection of a telephone line via a modem.

If it is found that the received time has not been updated for a certain period of time in the relay terminal storage unit 117, it is determined that the one-to-one-type communication unit is unable to communicate with the corresponding relay terminal. Then, the entry of the relay terminal is deleted from the relay terminal storage unit 117.

When the one-to-one-type communication unit is unable to communicate with the relay terminal which is providing relay services for a certain period of time, none of the entries in the relay terminal storage unit 117 is updated. In this case, it is determined that the one-to-one-type communication terminal is no longer able to communicate with the relay terminal. Accordingly, the period before determining that the one-to-one-type communication terminal is unable to communicate with the relay terminal is set longer than the period before determining that the entries of the other relay terminals are deleted from the relay terminal storage unit 117.

In this example, when the one-to-one-type communication terminal Cc1 determines that it is unable to communicate with the relay terminal Cs1, the relay terminal storage unit 117 of the one-to-one-type communication terminal Cc1 sends a request for changing the relay terminal to the user information processing unit 101.

In this case, as in the first embodiment, both the relay terminals Cs2 and Cs3 may be designated to the one-to-one-type communication terminal Cc1. Alternatively, the relay terminal storage unit 117 may select one of the designated terminals, such as the terminal whose relay terminal information has been updated most frequently.

According to the second embodiment of the present invention, even if communication with a relay terminal is suddenly discontinued without being able to receive an instruction to change the relay terminal due to the IrDA terminal being moved, or because a telephone line is suddenly disconnected via a modem, a one-to-one-type communication terminal is able to request another relay terminal to continue providing relay services.

Third Embodiment

In the first embodiment, even if a relay terminal discontinues relay services, a one-to-one-type communication terminal is able to continue communicating with other terminals by making a relay request to another relay terminal.

In this case, however, while the relay services are being shifted from one relay terminal to another relay terminal, the one-to-one-type communication terminal is unable to receive information sent to this terminal. In order to overcome this situation, in a third embodiment, a relay terminal which is to take over the relay services stores the information addressed to the one-to-one-type communication terminal until communication with the one-to-one-type communication terminal is restarted.

Figure 7:
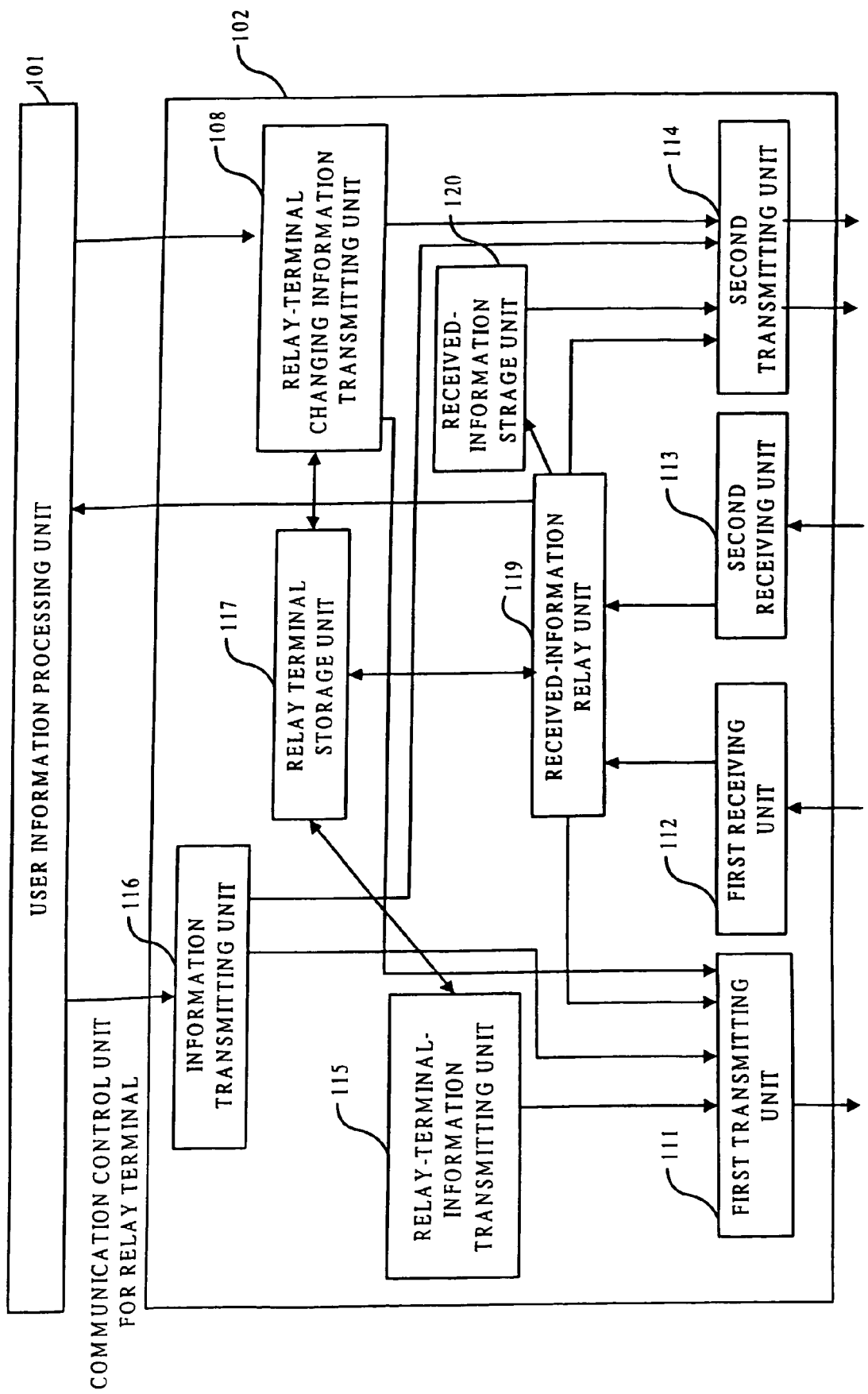
FIG. 7 is a block diagram schematically illustrating the configuration of a relay terminal according to a third embodiment of the present invention.

Details of the third embodiment are discussed below with reference to FIGS. 7 through 10. A relay terminal used in the third embodiment is configured as shown in FIG. 7. A one-to-one-type communication terminal and a LAN terminal used in the third embodiment are configured as illustrated in FIGS. 2 and 3, respectively.

According to the relay terminal shown in FIG. 7, the communication control unit 102 is formed of the first transmitting unit 111, the first receiving unit 112, the second receiving unit 113, the second transmitting unit 114, the relay-terminal-information transmitting unit 115, the information transmitting unit 116, the relay terminal storage unit 117, the relay-terminal changing information transmitting unit 118, the received-information relay unit 119, and a received-information storage unit 120.

The relay terminal of this embodiment differs from the counterpart of the first embodiment in that the received-information storage unit 120 is provided. Upon receiving information addressed to the one-to-one-type communication terminal, the received-information storage unit 120 receives the information from the received-information relay unit 119 and stores it. As discussed in the first embodiment, when the relay terminal discontinues the relay services, the relay-terminal changing information transmitting unit 118 has the function of sending ID information of an available relay terminal from the relay terminal storage unit 117 to the one-to-one-type communication terminal. An extra function is also added to the relay-terminal changing information transmitting unit 118 of this embodiment. That is, if information indicating that a relay terminal has refused to take over the relay services is received from the received-information relay unit 119 via the first receiving unit 112 or the second receiving unit 113, the relay-terminal changing information transmitting unit 118 searches for another relay terminal which can take over the relay services. If there is a corresponding relay terminal, relay terminal taking-over information is sent to the one-to-one-type communication terminal. If there is no available relay terminal, the relay-terminal changing information transmitting unit 118 reports to the one-to-one-type communication terminal via the first transmitting unit 111 or the second transmitting unit 114 that no relay terminal can take over the relay services.

The other functions of the elements are basically similar to those of the elements designated with the same reference numerals and the same names described in the first embodiment.

The process of taking over relay services by another relay terminal is described below according to the situation shown in FIG. 4, as in the first embodiment.

It is now assumed that the relay terminal Cs1 is relaying the information of the one-to-one-type communication terminal Cc1. When the relay terminal Cs1 is to discontinue the relay services, the user information processing unit 101 of the relay terminal Cs1 notifies the corresponding information to the relay-terminal changing information transmitting unit 118. Upon receiving this information, the relay-terminal changing information transmitting unit 118 transmits relay terminal taking-over information to the relay terminal which is to take over the relay services via the first transmitting unit 111.

The relay terminal taking-over information includes the ID information of the relay terminal which is providing the relay services and the ID Information of the one-to-one-type communication terminal which is receiving the services, in this example, the ID information of Cs1 and Cc1. As the relay terminal which is to take over the relay services, an available relay terminal having the smallest value of ID information, in this case, Cs2, may be selected. Alternatively, any available relay terminal may be selected. It is now assumed that the relay terminal Cs2 has been selected.

The first receiving unit 112 of the relay terminal which has received the relay terminal taking-over information sends it to the received-information relay unit 119.

The received-information relay unit 119 checks for the presence of a one-to-one-type communication terminal to which the relay terminal is currently providing relay services by referring to storage information of the relay terminal storage unit 117. If it is found that the relay terminal is not relaying information, the received-information relay unit 119 obtains the ID information of the relay terminal which is currently providing relay services and the corresponding one-to-one-type communication terminal from the relay terminal taking-over information, and stores the ID information of the one-to-one-type communication terminal and the relay situation in the relay terminal storage unit 117.

The relay situation stored in the relay terminal storage unit 107 has the following three attributes. A first attribute is "not relaying", which indicates that there is no one-to-one-type communication terminal to which the relay terminal is providing relay services. A second attribute is "taking over relay services", which represents that relay services are being taken over from one relay terminal to another relay terminal before a relay request is made from a one-to-one-type communication terminal. A third attribute is "relaying", which indicates that information of a one-to-one-type communication terminal is being relayed.

The information of the relay terminal storage unit 117 is shown in FIG. 8.

Upon completing the registration in the relay terminal storage unit 117, information indicating that the relay terminal has accepted to take over the relay services is sent via the first transmitting unit 111 to the relay terminal which is currently relaying information. In this case, the terminal Cs2 transmits the information to the terminal Cs1. If the relay terminal Cs2 has already started to provide relay services, information indicating that the terminal Cs2 has refused to take over the relay services is sent to the terminal Cs1 via the first transmitting unit 111.

Upon receiving either the acceptance information or the refusal information, the first receiving unit 112 of the relay terminal Cs1 sends the information to the relay-terminal changing information transmitting unit 118 via the received-information relay unit 119.

If the relay-terminal changing information transmitting unit 118 receives the refusal information, it searches for another relay terminal which can take over the relay services. If a corresponding relay terminal is found, relay terminal taking-over information is similarly transmitted. If there is no corresponding relay terminal, information indicating that there is no relay terminal to take over the relay services is reported to the one-to-one-type communication terminal.

In contrast, if the relay-terminal changing information transmitting unit 118 receives the acceptance information, it sends the relay terminal changing information to the one-to-one-type communication terminal, as in the first embodiment.

Upon receiving the relay terminal changing information, the one-to-one-type communication terminal sends a relay request to the designated relay terminal, as in the first embodiment. During this process, upon receiving the relay request from the one-to-one-type communication terminal Cc1, the relay terminal Cs2, which has accepted to take over the relay services, changes the relay situation stored in the relay terminal storage unit 117 from "taking over relay services" to "relaying" and starts to provide relay services. If the received-information relay unit 119 receives information addressed to the one-to-one-type communication terminal Cc1 while taking over relay services from the relay terminal Cs1, it stores the information in the received-information storage unit 120, and transmits it to the one-to-one-type communication terminal Cc1 via the second transmitting unit 114 at the start of providing relay services.

According to the communication network system constructed in accordance with the third embodiment of the present invention, while relay services are being shifted from one relay terminal to another relay terminal, information addressed to a one-to-one-type communication terminal is stored. Then, as soon as the provision of relay services is started, the stored information is sent to the one-to-one-type communication terminal. As a result, the information can be efficiently received by the one-to-one-type communication terminal without losing it.

To further develop the present invention, another communication network system is described below through illustration of a fourth embodiment. In this network system, a central relay terminal for centrally managing the situation of all the relay terminals is provided, and only the telephone number of the central relay terminal is required to enable a one-to-one-type communication unit to receive relay services.

Fourth Embodiment

If the telephone number of only one relay terminal is known to a one-to-one-type communication terminal using a modem, and if the relay terminal has already begun to provide relay services to another one-to-one-type communication terminal, the one-to-one-type communication terminal is unable to receive the relay services.

To overcome this drawback, the following type of network system is implemented in the fourth embodiment. A central relay terminal for centrally managing the situation of all the relay terminals is provided, and then, only the telephone number of the central relay terminal is required to enable a one-to-one-type communication terminal to receive relay services.

Figure 11:
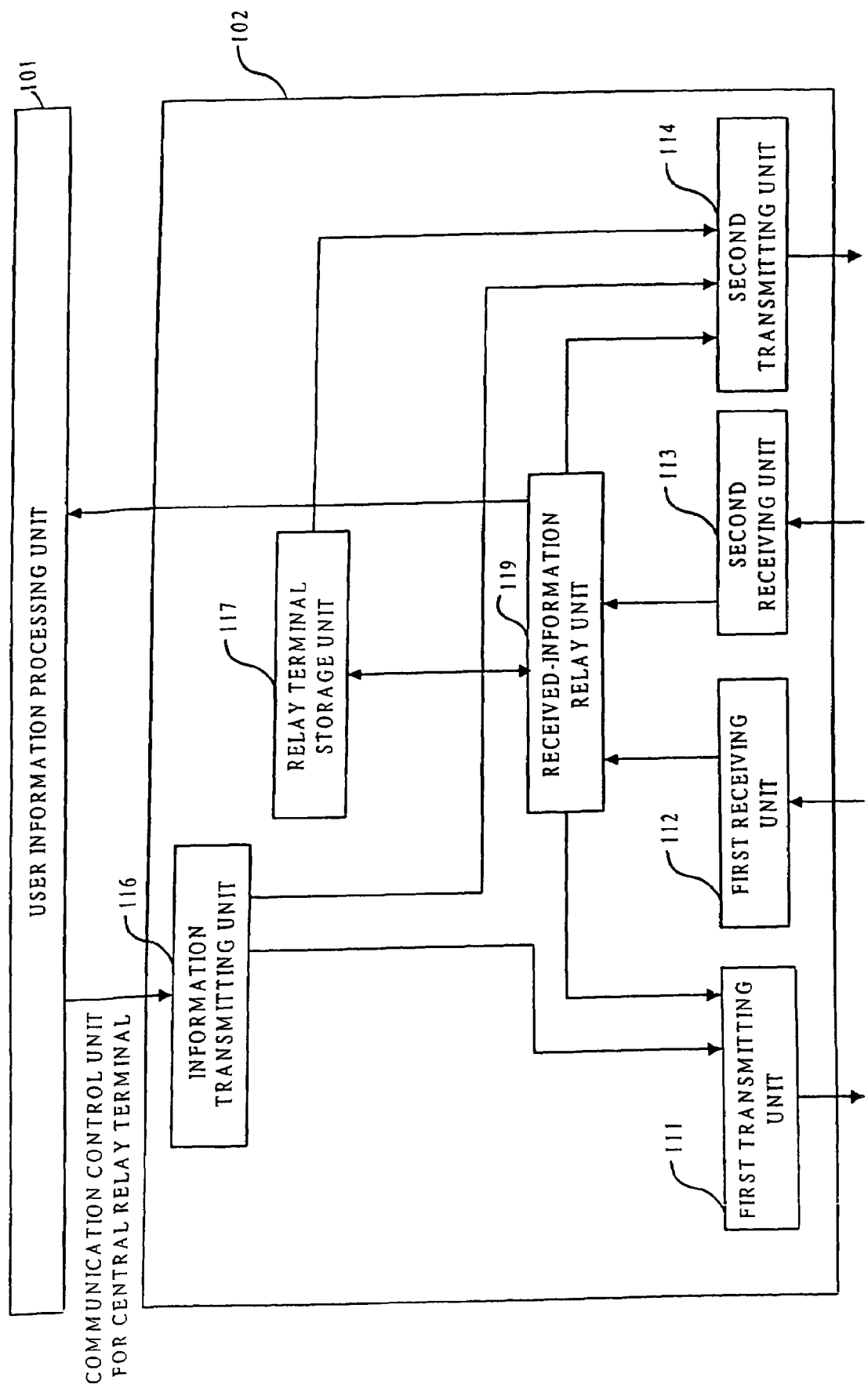
FIG. 11 is a block diagram schematically illustrating the configuration of a central relay terminal according to the fourth embodiment of the present invention.
Figure 12:
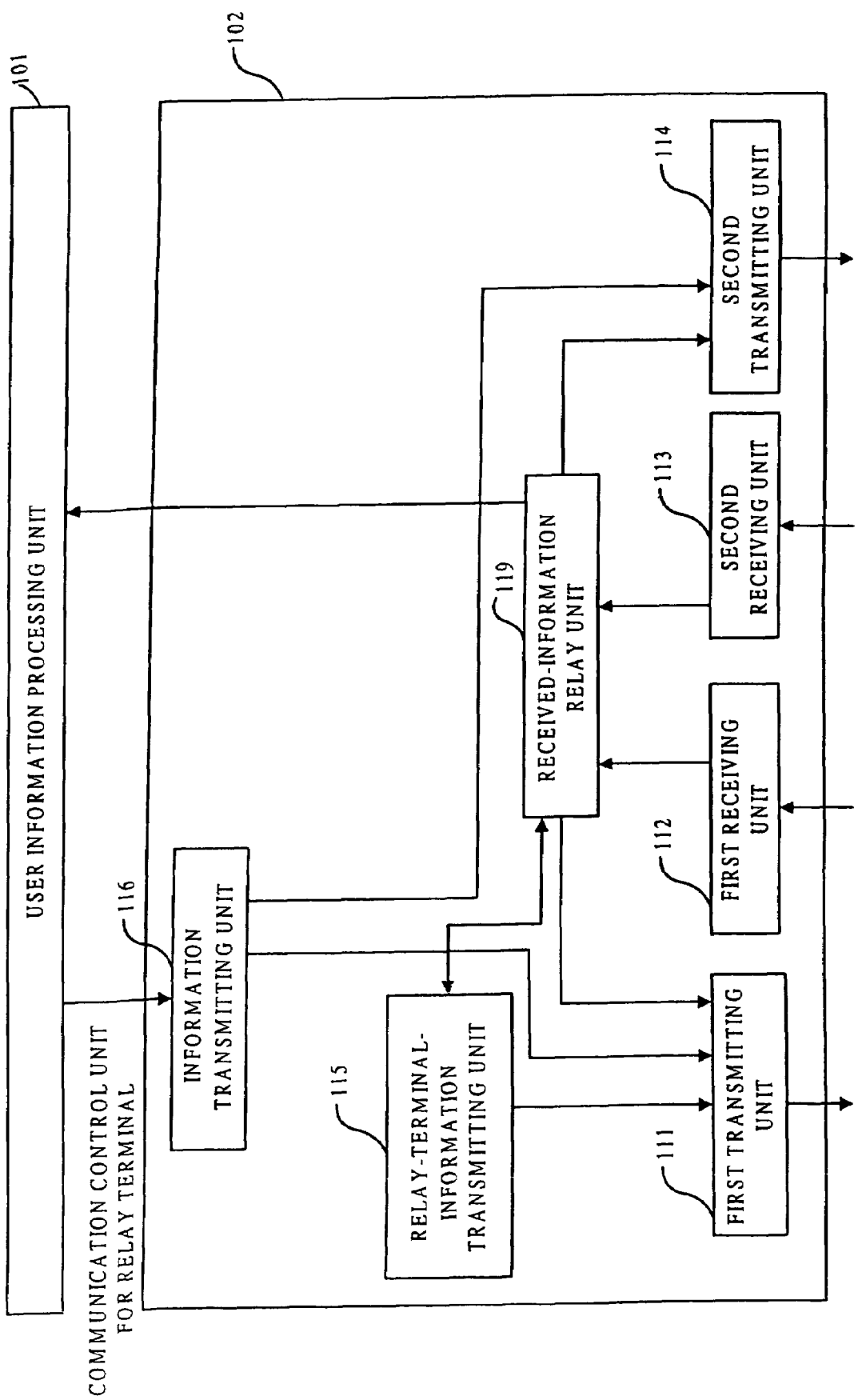
FIG. 12 is a block diagram schematically illustrating the configuration of a relay terminal according to the fourth embodiment of the present invention.

The fourth embodiment is discussed in detail below with reference to FIGS. 11 and 12. The central relay terminal used in the fourth embodiment is configured as shown in FIG. 11, while the other relay terminals are configured as illustrated in FIG. 12. A one-to-one-type communication terminal and a LAN terminal are configured similarly to those of the first embodiment. The individual elements of the central relay terminal and the other relay terminals are similar to those of the first embodiment.

According to the central relay terminal, the communication control unit 102 is formed of, as shown in FIG. 11, the first transmitting unit 111, the first receiving unit 112, the second receiving unit 113, the second transmitting unit 114, the information transmitting unit 116, the relay terminal storage unit 117, and the received-information relay unit 119. The central relay terminal is different from the relay terminal shown in FIG. 1 in that the relay-terminal-information transmitting unit 115 and the relay-terminal changing information transmitting unit 118 are not disposed. The other elements are basically similar to those of the relay terminal designated with the same reference numerals and the same names shown in FIG. 1.

According to the relay terminal, the communication control unit 102 is formed of, as shown in FIG. 12, the first transmitting unit 111, the first receiving unit 112, the second receiving unit 113, the second transmitting unit 114, the information transmitting unit 116, the relay-terminal-information transmitting unit 115, and the received-information relay unit 119. The relay terminal shown in FIG. 12 is different from the relay terminal shown in FIG. 1 in that the relay terminal storage unit 117 and the relay-terminal changing information transmitting unit 118 are not disposed. The other elements are basically similar to those of the relay terminal designated with the same reference numerals and the same names shown in FIG. 1.

The process of designating the relay terminal which is providing relay services to a one-to-one-type communication terminal by the central relay terminal is discussed below according to the situation shown in FIG. 9.

The relay terminals Cs1, Cs2, and Cs3 configured as shown in FIG. 12 each transmit relay terminal information from the relay-terminal-information transmitting unit 115 via the first transmitting unit 111 in a manner similar to the first embodiment.

Upon receiving the relay terminal information from the relay terminals Cs1, Cs2, and Cs3 via the first receiving unit 112, the central communication terminal Cm configured as shown in FIG. 11 sends the information to the received-information relay unit 119.

The received-information relay unit 119 stores the relay terminal information in the relay terminal storage unit 117 according to a method similar to that discussed in the first embodiment.

In this case, the storage content of the relay terminal storage unit 117 is as illustrated in FIG. 10. That is, the relay terminals Cs1 and Cs2 are not providing relay services to any communication terminal. The relay terminal Cs3 is providing relay services to a one-to-one-type communication terminal Cc3.

When a one-to-one-type communication terminal Cc1 is to receive relay services, the user information processing unit 101 of the terminal Cc1 first sends relay terminal inquiry information to the central relay terminal Cm via the information transmitting unit 116.

In the central relay terminal Cm, upon receiving the inquiry information, the second receiving unit 113 sends the information to the received-information relay unit 119. The received-information relay unit 119 obtains ID information of available relay terminals from the relay terminal storage unit 117 and transmits it via the second transmitting unit 114 in response to the inquiry information sent from the one-to-one-type communication terminal.

Figure 9:
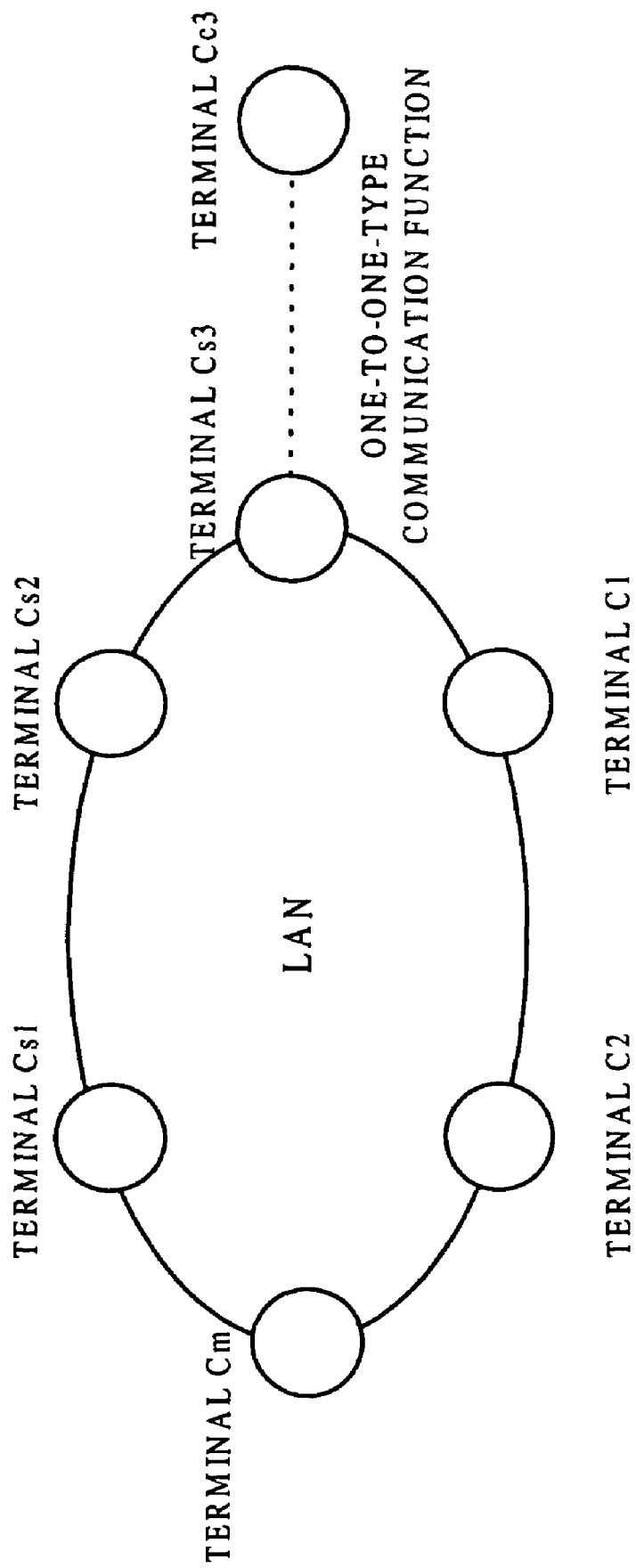
FIG. 9 illustrates the current relay situation in a network system according to a fourth embodiment of the present invention.

In this example shown in FIG. 9, the ID information of both the relay terminals Cs1 and Cs2 may be sent, or the ID information of either of the terminal Cs1 or Cs2 may be selected.

The one-to-one-type communication terminal Cc1 then identifies the available relay terminal from the received ID information and makes a relay request to the relay terminal. With this arrangement, when the one-to-one-type communication function is implemented by using a modem, the telephone number of only the central relay terminal Cm is required to enable the one-to-one-type communication terminal to receive relay services.

When the relay terminal is to discontinue relay services, the user information processing unit 101 of the relay terminal transmits the corresponding information to the one-to-one-type communication unit via the information transmitting unit 116. Then, the one-to-one-type communication terminal recognizes that the relay services have been discontinued and makes an inquiry to the central relay terminal Cm according to the above-described process in order to request another relay terminal to provide relay services.

According to the communication network system constructed in accordance with the fourth embodiment, even if a relay terminal discontinues relay services, a one-to-one-type communication terminal is able to continue communicating with the other terminal in the network by making an inquiry to the central relay terminal Cm about a relay terminal which can take over the relay services.

Fifth Embodiment

In a fifth embodiment of the present invention, a relay terminal has at least two first transmitting units 111 and two first receiving units 112 similar to those of the first embodiment. In the first embodiment, information is transmitted to and received from a wireless LAN through the first transmitting unit 111 and the second receiving unit 112. In the fifth embodiment, a communication network system having not only the function of communicating with a wireless LAN, but also the function of communicating with a cable LAN, is provided.

In a relay terminal, information received from a wireless LAN is relayed to a cable LAN and to the second transmitting unit 114; information received from the cable LAN is relayed to the wireless LAN and to the second transmitting unit 114; and information received from the second receiving unit 113 is relayed to a transmitting unit of the wireless LAN and to a transmitting unit of the cable LAN. It is thus possible to perform communication among wireless LAN terminals, cable LAN terminals, and one-to-one-type communication terminals, which cannot be conventionally achieved.

According to the relay terminal of the fifth embodiment, a plurality of first transmitting units 111 and a plurality of receiving units 112 are provided. Accordingly, the relay terminal of this embodiment differs from that of the first embodiment merely in the content of the relay terminal information and the function of the relay terminal storage unit 117. Thus, only the above two features are explained below.

The relay terminal information includes communication devices which are receiving relay services and the presence or the absence of such communication devices. If there is any one-to-one-type communication device, ID information of one-to-one-type communication terminals is contained in the relay terminal information. It is now assumed that the relay terminal Cs1 has a function of performing one-to-one-type communication with a wireless LAN and a cable LAN and is relaying information of all the terminals. In this case, the relay terminal information indicates that the relay terminal Cs1 is providing relay services to the wireless LAN, the cable LAN, and the one-to-one-type communication terminal Cc1. Upon receiving the relay terminal information, the relay terminal Cs1 stores it in the relay terminal storage unit 117 according to a process similar to that described in the first embodiment.

However, according to N-to-N-type communication devices, such as a wireless LAN or a cable LAN, if a plurality of terminals are providing relay services in a single communication device, a loop is formed in the communication network, and the information may be relayed endlessly. Thus, each relay terminal searches the relay terminal information for terminals which are currently providing relay services in the same communication device, and if there is a relay terminal which has already started relay services, the corresponding relay terminal stops providing services. The terminal which stops relay services may be determined by comparing the ID values, in which case, either the terminal having a greater value or the terminal having a smaller value may be determined.

When the relay terminal discontinues relay services, relay services are taken over from this terminal to another relay terminal for continuing providing the services to a one-to-one-type communication terminal according to a process similar to that stated in the first embodiment. Considering the possibility of forming an endless loop described above, the information of the terminal having the smallest ID value in the same communication device is obtained from the relay terminal storage unit 117 and only this terminal is entitled to restart relay services through the corresponding first transmitting unit 111 and the first receiving unit 112. Alternatively, the terminal having the greatest ID value or the ID value closest to the ID value of the terminal which has

Sixth Embodiment

In a sixth embodiment of the present invention, as well as in the first and fifth embodiments, ID information of a communication device and a terminal which are receiving relay services are provided for the relay terminal information. For example, if a terminal Cs1 has a one-to-one-type communication function with communication devices, such as a wireless LAN, an IrDA device, and a Bluetooth device (which is described in detail below), and is providing relay services to all the devices, the relay terminal information indicates that IrDA communication is performed with a terminal Cc1, and Bluetooth communication is performed with a terminal Cbt1. Such relay terminal information is received and is stored in the relay terminal storage unit 117 according to a process similar to that of the first embodiment. As the communication devices, a modem may be included.

Details of Bluetooth (hereinafter referred to as "BT") are as follows. The BT is a wireless communication technique for use in mobile terminals recommended by many companies, and is targeted for the use in offices and households. By using this technique, notebook personal computers, PDAs, and cellular telephones are connected to each other without cables so that they can exchange sound and data. By utilizing a 2.4 GHz frequency band, which can be used without a license, communication can be performed at approximately 1 Mbps. Unlike the IrDA technique, the distance between devices is about 10 m, and communication can be performed even if there is an obstacle between the devices.

When the above-described relay terminal discontinues IrDA services, the IrDA services are shifted to another relay terminal according to a process similar to that stated in the first embodiment. When the relay terminal stops BT services, the BT services are shifted to another relay terminal according to a process similar to that described in the first embodiment. If both services are discontinued, both processing is performed.

Seventh Embodiment

In a seventh embodiment of the present invention, as well as in the fifth and sixth embodiments, communication devices which are receiving relay services and the presence or the absence of such devices are provided for the relay terminal information. If there is any one-to-one-type communication device, ID information of one-to-one-type communication terminals is contained in the relay terminal information.

For example, if the terminal Cs1 has a one-to-one-type communication function of communicating with communication devices, such as a wireless LAN, a cable LAN, an IrDA device, and a Bluetooth device, and relaying information of all the devices, the relay terminal information indicates that the relay terminal Cs1 is providing relay services to the wireless LAN, the cable LAN, the IrDA device Cc1, and the BT device Cbt1. Such relay service information is received and stored in the relay terminal storage unit 117 according to a process similar to that discussed in the first embodiment.

The relay services are taken over from one relay terminal to another relay terminal for the LAN devices through the first transmitting unit 111 and the first receiving unit 112 in a manner similar to the fifth embodiment, and for the one-to-one-type communication devices through the second transmitting unit 114 and the second receiving unit 113 in a manner similar to the sixth embodiment.

Eighth Embodiment

In an eighth embodiment, a relay terminal has a third transmitting unit and a third receiving unit instead of a first transmitting unit 111 and a first receiving unit 112 for use in a cable LAN, which are provided for the fifth embodiment. The third transmitting unit and the third receiving unit are able to perform only one-to-N-type communication. The other elements and functions are similar to those of the fifth embodiment.

What is claimed is:

1. A communication network system comprising:
   a plurality of communication terminals, each comprising:
   a first transmitting device; and
   a first receiving device,
   the communication terminals connected via a transmission channel, information being transmitted and received among said communication terminals through said first transmitting device and said first receiving device, at least two of said communication terminals being used as relay terminals, each of said relay terminals comprising:
   a second transmitting device configured to perform only one-to-one communication;
   a second receiving device configured to perform only one-to-one communication;
   a received-information relay device configured to transmit information received from said first receiving device to said second transmitting device, the received-information relay device configured to transmit information received from said second receiving device to said first transmitting device;
   a relay-terminal-information transmitting device configured to transmit relay terminal information to said first transmitting device, the relay terminal information comprising terminal identification information of said relay terminals and terminal identification information of a terminal to which said relay terminals are providing relay services
   a relay terminal storage device configured to store the terminal identification information of said relay terminal, identification information of another relay terminal and relay situations of the relay terminals, which are acquired from the relay terminal information received from said first receiving device; and
   a changing device,
   wherein when the relay terminal which is providing the relay services discontinues the relay services, the changing device refers to the relay terminal storage device to determine whether an available relay terminal is present or absent, and
   if the changing device determines that there is an available relay terminal, the changing device provides an instruction is to the terminal which is receiving the relay services to change the available relay terminal.

2. The communication network system according to claim 1, wherein said relay-terminal-information transmitting device is configured to transmit the relay terminal information regularly.

3. The communication network system according to claim 1, wherein, when the relay terminal discontinues the relay services the terminal which is receiving the relay services changes from the relay terminal to the available relay terminal, and the available relay terminal then stores received information addressed to the terminal which is receiving the relay services until a connection is established between the available relay terminal and the terminal which is receiving the relay services.

4. A communication network system comprising:
a plurality of communication terminals, each comprising:
   a first transmitting device; and
   a first receiving device,
the communication terminals connected via a transmission channel, information being transmitted and received among said communication terminals through said first transmitting device and said first receiving device, at least one of said communication terminals being used as a central relay terminal, and at least one of said communication terminals being used as a relay terminal, said relay terminal comprising:
   a second transmitting device configured to perform only one-to-one communication;
   a second receiving device configured to perform only one-to-one communication;
   a first received-information relay device configured to transmit information received from said first receiving device to said second transmitting device, the first received-information relay device configured to transmit information received from said second receiving device to said first transmitting device; and
   a relay-terminal-information transmitting device configured to transmit relay terminal information to said first transmitting device, the relay terminal information comprising terminal identification information of said relay terminal and terminal identification information of a terminal to which said relay terminal is providing relay services
said central relay terminal comprising:
   a relay-terminal storage device configured to store terminal identification information of said relay terminal, terminal identification information of another relay terminal and relay situations of the relay terminals, which are acquired from the relay terminal information received from said first receiving device; and
   a second received-information relay device,
wherein when the central relay terminal receives from a terminalin the plurality of communication terminals a request to provide the relay services, the second received-information relay device refers to the relay-terminal storage device to obtain terminal identification information of an available relay terminal and transmits the obtained terminal identification information of the available relay terminal to the terminal which makes the request.

5. The communication network system according to claim 1, wherein each relay terminal comprises at least two of said first transmitting device and at least two of said first receiving device.

6. The communication network system according to claim 1, wherein each relay terminal comprises at least two of said second transmitting device and at least two of said second receiving device.

7. The communication network system according to claim 1, wherein each relay terminal comprises at least two of said first transmitting device, at least two of said first receiving device, at least two of said second transmitting device and at least two of said second receiving device.

8. A communication network system comprising:
a communication terminal comprising:
   a first transmitting device; and
   a first receiving device;
a plurality of relay terminals, the communication terminal and the relay terminals connected to each other via a transmission channel, the communication terminal transmitting and receiving information to and from the transmission channel through said first transmitting device, each of said relay terminals comprising:
a second transmitting device configured to perform only one-to-one communication;
a second receiving device configured to perform only one-to-one communication;
a third transmitting device configured to perform only one-to-N communication;
a third receiving device configured to perform only one-to-N communication, each of the relay terminals transmitting and receiving information to and from the transmission channel through the third transmitting device and the third receiving device;
a received-information relay device configured to transmit information received from said third receiving device to said second transmitting device, the received-information relay device configured to transmit information received from said second receiving device to said third transmitting device;
a relay-terminal-information transmitting device configured to transmit relay terminal information to said third transmitting device, the relay terminal information comprising terminal identification information of said corresponding relay terminal and terminal identification information of a terminal to which said corresponding relay terminal is providing relay services;
a relay terminal storage device configured to store the terminal identification information of said corresponding relay terminal, terminal identification information of another relay terminal and relay situations of the relay terminals, which are acquired from the relay terminal information received from said third receiving device; and
a changing device,
wherein when the corresponding relay terminal which is providing the relay services discontinues the relay services the changing device refers to the relay terminal storage device to determine whether an available relay terminal is present or absent, and
if the changing device determines that there is an available relay terminal, the changing device provides an instruction to the terminal which is receiving the relay services to change the available relay terminal.

9. A relay terminal for use in a communication network systems, which comprises a plurality of communication terminals, each of the communication terminals comprising:
   a first transmitting device; and
   a first receiving device,
the communication terminals connected via a transmission channel, information being transmitted and received among said communication terminals through said first transmitting device and said first receiving device, one of said communication terminals being used as said relay terminal, said relay terminal comprising:
   a second transmitting device configured to perform only one-to-one communication;
   a second receiving device configured to perform only one-to-one communication;

a received-information relay device configured to transmit information received from said first receiving device to said second transmitting device, and the received-information relay device configured to transmit information received from said second receiving device to said first transmitting device;

a relay-terminal-information transmitting device configured to relay terminal information to said first transmitting device, the terminal information comprising terminal identification information of said relay terminal and terminal identification information of a terminal to which said relay terminal is providing relay services;

a relay terminal storage device configured to store the terminal identification information of said relay terminal, terminal identification information of another relay terminal and relay situations of the relay terminals, which are acquired from the relay terminal information received from said first receiving device; and a changing device, wherein when the relay terminal which is providing the relay services discontinues the relay services, the changing device refers to the relay terminal storage device to determine whether an available relay terminal is present or absent, and if the changing device determines that there is an available relay terminal, the changing device provides an instruction to the terminal which is receiving the relay services to change the available relay terminal.

* * * * *

UNITED STATES PATENT AND TRADEMARK OFFICE
CERTIFICATE OF CORRECTION

PATENT NO. : 7,123,914 B2 Page 1 of 1
APPLICATION NO. : 10/748144
DATED : October 17, 2006
INVENTOR(S) : Matsubara et al.

It is certified that error appears in the above-identified patent and that said Letters Patent is hereby corrected as shown below:

On the title page, Item (30), the Foreign Application Priority Data has been omitted. Item (30) should read:

--(30)     Foreign Application Priority Data

Mar. 31, 1999 (JP) ..........................11-091719 --

Signed and Sealed this

Second Day of January, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,123,914 B2 | Page 1 of 1 |
| APPLICATION NO. | : 10/748144 | |
| DATED | : October 17, 2006 | |
| INVENTOR(S) | : Shinzo Matsubara et al. | |

It is certified that error appears in the above-identified patent and that said Letters Patent is hereby corrected as shown below:

On the title page, Item (63), the Related U.S. Application Data Item (63) should read:

-- Related U.S. Application Data
(63) Continuation of application No. 09/534,457, filed on Mar. 27, 2000, now Pat. No. 6,693,875 --

Signed and Sealed this

Thirty-first Day of August, 2010

David J. Kappos
*Director of the United States Patent and Trademark Office*